F. T. ROBERTS.
APPARATUS FOR MAKING HOLLOW RUBBER ARTICLES.
APPLICATION FILED OCT. 2, 1913.
1,157,420.
Patented Oct. 19, 1915.
2 SHEETS—SHEET 2.
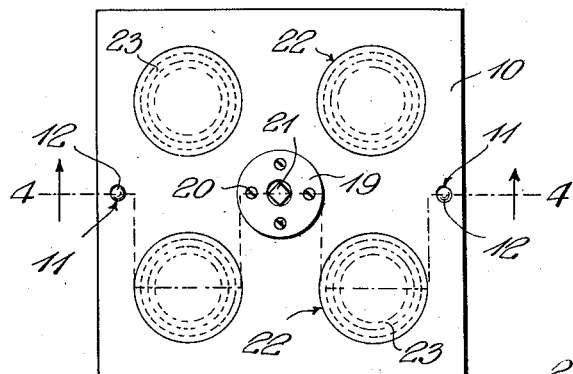
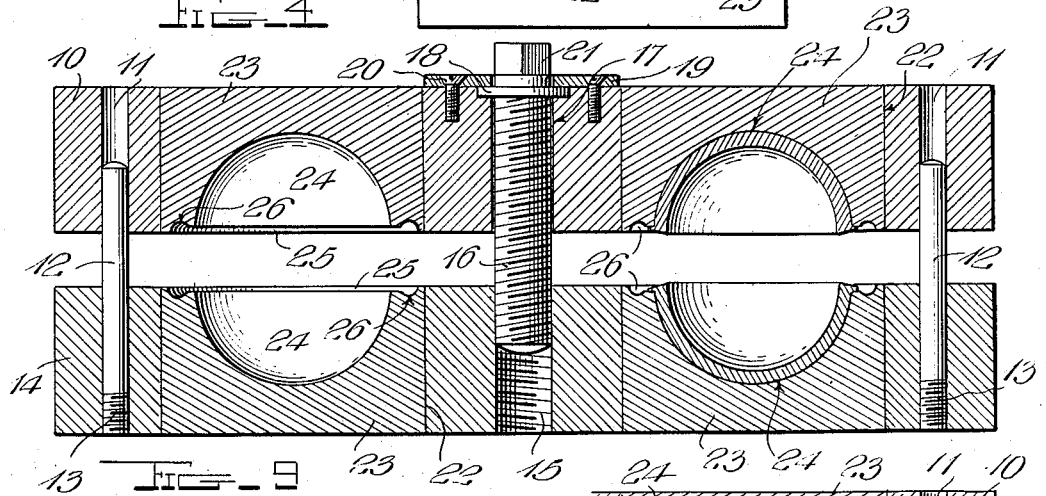
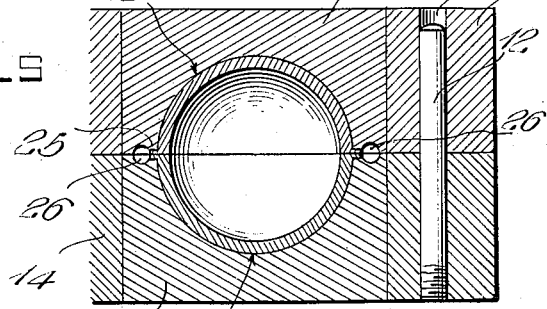
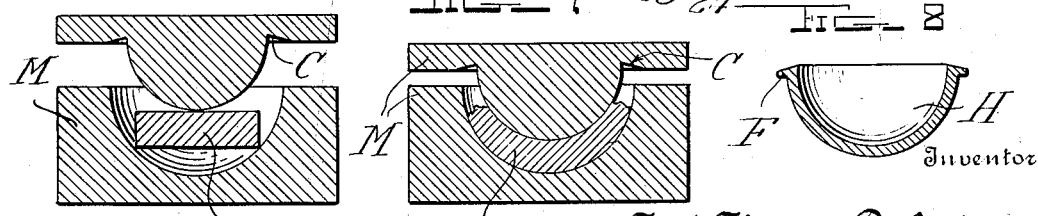
Inventor
Fred Thomas Roberts
By H. B. Willson & Co.
Attorneys
Witnesses
J. Ralph Hoge

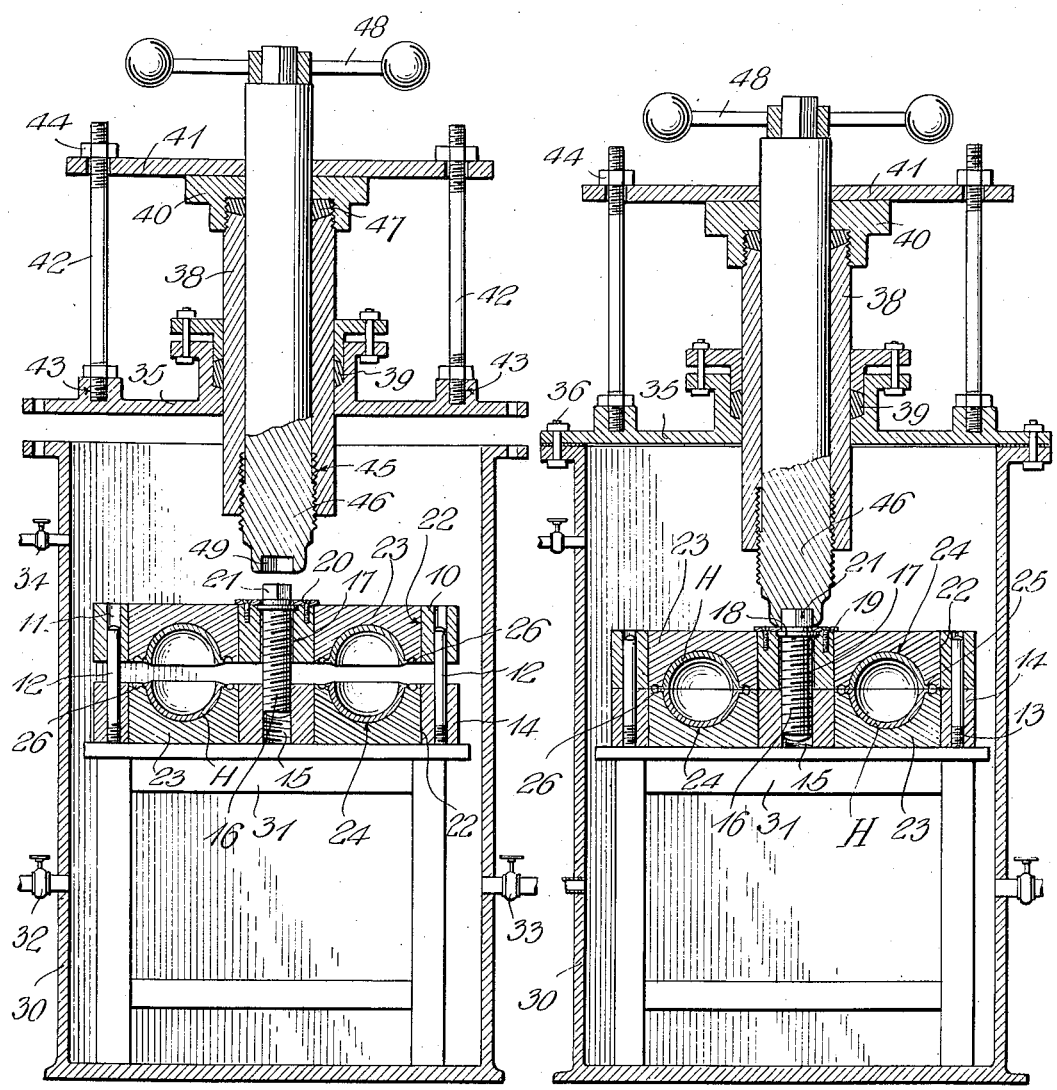

UNITED STATES PATENT OFFICE.

FRED THOMAS ROBERTS, OF TRENTON, NEW JERSEY, ASSIGNOR, BY DIRECT AND MESNE ASSIGNMENTS, TO THE ARANAR COMPANY, OF CLEVELAND, OHIO, A CORPORATION OF OHIO.

APPARATUS FOR MAKING HOLLOW RUBBER ARTICLES.

1,157,420.      Specification of Letters Patent.      Patented Oct. 19, 1915.

Application filed October 2, 1913. Serial No. 793,026.

*To all whom it may concern:*

Be it known that I, FRED THOMAS ROBERTS, a citizen of the United States, residing at Trenton, in the county of Mercer and State of New Jersey, have invented certain new and useful Improvements in Apparatus for Making Hollow Rubber Articles; and I do declare the following to be a full, clear, and exact description of the invention, such as will enable others skilled in the art to which it appertains to make and use the same.

This invention relates to molding devices for making rubber articles or those of a composition containing so much rubber that the article may be subjected to the curing process, and more especially to presses for subjecting the partly cured articles to the heating and vulcanizing steps by which they are finished.

The object of the invention is the production of an apparatus for uniting the parts of a hollow rubber article in a tank or chamber while subjected to the influence of compressed air or a compressed gas.

This apparatus is designed especially for the formation of hollow globular articles, such as tennis balls, which have heretofore been made in halves and the edges of the halves cured together by an apparatus which often produced a seam on the interior where the halves were connected. Hitherto also such balls have been made with a soft rubber button which was later pierced with a needle, and the hole was closed after they had been inflated by the introduction of air under pressure.

The present apparatus is designed to avoid the production of an internal seam or ridge as well as any internal protuberance where the hole is sealed, and also it is designed to prevent the thickening or stiffening of the walls of the ball at any point—the object aimed at being to produce a tennis ball whose walls throughout shall be of uniform material and thickness and substantially uniform density so that it will bounce truly from the ground or the racket. This object is carried out by the apparatus hereinafter more fully described and claimed, and shown in the accompanying drawings wherein—

Figure 1 is a vertical sectional view through the complete apparatus before the plates of the flask are brought together, and Fig. 2 is a similar section showing the plates as brought into contact with each other. Fig. 3 is a plan view of the press or flask. Fig. 4 is an enlarged vertical section on line 4—4 of Fig. 3, the right side of this view showing two halves of the ball in place within the blocks of said flask; and Fig. 5 is a similar section of the right hand portion of Fig. 4 showing the blocks as brought together to unite said halves. Figs. 6 and 7 are sectional views of the two-part mold in which the half-ball is produced, and Fig. 8 is a section of said half. Fig. 9 is a sectional detail of the finished article, showing at the sides thereof the dotted flanges which are later trimmed off by any suitable means.

In a companion application filed by me on even date herewith and bearing Serial Number 793,025, I have described and illustrated a method by means of which a hollow inflated article such as a rubber tennis ball may be made without the formation of any seam or protuberance on the interior of the ball and without making its wall of increased thickness or density at any point; and the present application covers the apparatus for carrying out said method after the partly-cured half-ball has been made. In Figs. 6 and 7 of the drawings attached hereto are shown the two members of a mold M designed to act on a block of raw rubber R when they are brought together to give it the shape of the half-ball H illustrated in Fig. 8, the same having a radially projecting flange F around its mouth which is produced by forming a channel C in one of the die-members as indicated in Fig. 6. The rubber (or rubber composition) article H shown in Fig. 8 is removed from the mold M in a partly-cured condition, and it is the purpose of this apparatus covered by the present application to unite two of these halves H into a ball as herein shown and described, although obviously the finished product could be any other hollow rubber article.

Coming now to the details of the present invention, the flask is shown in plan view in Fig. 3 as being square in shape and having cavities for making four balls at once, although of course there could be a greater or lesser number of cavities if desired. The upper plate 10 has upright sockets 11 into which slide dowel pins 12 which are screwed at 13 into sockets in the lower plate 14 and rise above the upper face of the latter, and the lower plate has a threaded central hole 15 engaged by the threads of a screw 16 which is rotatably mounted within a smooth hole 17 in the upper plate 10 and projects below the lower face of this plate as seen. Within said hole 17 the screw is swiveled in any suitable manner, preferably by having a flange 18 around it overlying the plate and held in place thereon by a face plate or keeper 19 removably secured to the plate as by screws 20, and the upper end of the screw 16 is squared as at 21. The purpose of the dowel pins is to guide one plate directly toward the other, and the purpose of the screw is to cause the movements of the upper plate toward and from the lower as the screw is turned in one direction or the other. Through two plates are formed alined apertures 22 into which are secured flask sections in the shape of steel blocks 23, each block having a hemi-spherical cavity 24 whose mouth is surrounded by a radial channel 25 made a little deeper at its outer edge so as to produce an annular gutter 26 for a purpose yet to appear. The cavity and channel are of a size and shape to receive the half-article H which will of course stick in the uppermost block when placed therein while it is yet sticky by reason of its semi-cured condition; and another half-article H will lie in the cavity in the lowermost block directly beneath. In the rapid formation of a number of tennis balls there will be several of these flasks or certainly two of them, so that the finished articles may be taken from one flask and trimmed and the flask loaded with several half-articles H, while the other flask is being subjected to the treatment illustrated in Figs. 1 and 2.

Referring now to Sheet 1 of the drawings, the numeral 30 designates a tank or chamber of good size, possibly containing a table or other support 31 on which the flask may lie, and through the walls of this tank are steam inlet and air inlet pipes 32 and 33 controlled by suitable valves, and an outlet pipe 34 also suitably controlled. The cover 35 for the tank or chamber 30 is removably attached thereto in any suitable manner, as by means of clasps or bolts 36 passing through its edges and through flanges provided around the open upper end of the tank. Through the center of the cover passes a tubular guide 38, preferably surrounded by a packed joint 39 of any suitable character to prevent leakage, and its upper end screws into a gland nut 40 which stands beneath the cross head 41 of a yoke, the arms of the latter being herein shown as consisting of bolts or rods 42 screwed into sockets 43 on the cover and passing through the ends of the cross head 41 where they receive adjusting nuts 44. By these or similar details of construction the guide 38 is mounted removably and yet in an air-tight manner through the cover, and is held in place by an adjustable yoke. The guide is threaded internally at its lower end as at 45, and engaging these threads are external threads on the lower end of a key 46 whose body above its threaded portion is cylindrical and fits closely through the packing 47 under the gland nut 40 to prevent leakage. The upper end of the key has a handle 48 of any suitable kind, and its lower extremity has a squared socket 49 adapted to fit over the squared upper end 21 of the screw 16.

With an apparatus constructed as above described, a complete tennis ball or other hollow inflated article is made by taking two of the half-articles H shown in Fig. 8 and inserting them in the cavities in two oppositely disposed blocks, or four pairs of said halves H if the flask has four pairs of blocks as shown. The cover of the tank is then removed and the open flask placed on the table or support 31 as seen in Fig. 1. The cover is then replaced and secured in position in an air-tight manner by means of the bolts or clasps 36, and by manipulating the handle 48 the key is run down in the threads 45 until its squared lower end 49 engages the squared upper end of the screw 16. As the latter is screwed into the threaded hole 15 in the lower plate, its swiveled connection with the upper plate causes the two plates to come together, and therefore the two edges of the halves H are brought together as seen in Fig. 5. Meanwhile, however, air or a suitable gas under pressure has been admitted through the pipe 33 to the interior of the tank, whence it of course passes into the halves H while they are in the blocks 23, and when their edges are brought together as seen in Fig. 5, the fluid under pressure is trapped within the ball being formed. Its presence therein prevents any of the surplus gummy or half-cured material from being pressed into the interior of the ball, and therefore the surplus material is forced outward into the channel 25 and even beyond the channel into the gutter 26, as the air outside of said gutter may escape between the contacting faces of the blocks and plates. The air pipe 33 is now closed and the outlet 34 opened, and steam admitted at the point 32 to complete the curing of the rubber as well known in this art; or the entire press may be carried to a vulcanizer and the curing finished there. Then the flask is opened, the finished articles taken out of place as seen in Fig. 9, and the flange around each ball trimmed off with a suitable tool or instrument. Thus it will be seen that this apparatus will produce a ball whose wall is of uniform thickness and density throughout and which has no ridge on its interior or exterior where the seam would occur between its two members. Meanwhile, the other flask if there be two, has been loaded with four pairs of articles H as seen in Fig. 8, and it can be quickly substituted for the one removed so that the operation is continued uninterruptedly.

While I do not wish to be limited to the materials and proportions of parts, I would preferably make the tank of considerable size as theoretically illustrated in Figs. 1 and 2, so that it would admit a flask whose blocks had cavities for shaping other products, such as bulbs, hollow toys, or articles which when finished may not be sealed and cannot therefore be called inflated. The possibility that the product may be of considerable size accounts for the means employed herein to render the guide adjustable. When it is adjusted the guide obviously carries the key with it, as I would preferably form the threads only at the lower end of the key and have its upper part surrounded by the packing 47 within the gland nut 40 to prevent leakage.

What is claimed as new is:

1. In an apparatus of the class described, the combination of a chamber adapted to contain an atmosphere under pressure, a flask adapted to be located within the chamber and contain an article to be closed in such atmosphere, a screw for forcing the members of the flask together, a wrench for turning the screw, means outside of the chamber for turning the wrench, and means for causing said wrench to follow the screw as the parts of the flask are drawn together.

2. In an apparatus of the class described, the combination of a flask, a screw connected therewith and adapted to bring the two parts of the flask together, a chamber adapted to contain such flask, a rotatable wrench extending from outside into the chamber, and means for causing said wrench to travel lengthwise of its axis as it rotates, whereby it follows the screw as the same brings the parts of the flask together.

3. In an apparatus of the class described, the combination with a flask and a screw for forcing its members together, of an air-tight tank having a top provided with a guide above said screw, a key whose shank is rotatably mounted within said guide and whose inner end is adapted to engage said screw, means for causing the key while rotating to follow the screw, and means for admitting fluid to said tank.

4. In an apparatus of the class described, the combination with a flask and a headed screw for forcing its members together, of an air-tight tank having a removable cover, a tubular guide mounted in said cover above said screw and having an internal thread, and a key having its outer portion cylindrical and mounted within said guide and having an external thread engaging the threads of the guide, the inner extremity of the key having a socket shaped to engage the head of said screw.

5. In an apparatus of the class described, the combination of a flask, means transportable with the flask parts for forcing the two parts of the flask together and holding them together, a chamber adapted to contain said flask, and a device extending from inside the chamber to the outside and adapted to operate the means which forces the parts of the flask together.

6. In an apparatus of the class described, the combination of a pair of plates each carrying a set of mold cavities, means carried by the plates for forcing them together and locking them together with their respective cavities registering, an air-tight container for the plates, mechanism operable from outside the container for operating the means for forcing together the plates within the container, and means for supplying fluid under pressure to the container.

7. In a device of the character described, the combination of a chamber, a two-part flask adapted to stand within the chamber, means for forcing the two parts of the flask together, a rotatable device for operating said means, and a longitudinally adjustable guide within which said device rotates, said guide being carried by the chamber and extending from the inside to the outside thereof.

8. In an apparatus of the character described, the combination of a two-part flask, a screw for forcing the two parts together, a casing adapted to contain the flask, a tubular guide carried by the casing and longitudinally adjustable therein, a rotatable wrench mounted in the guide and adapted to engage said screw.

9. In an apparatus of the character described, the combination of a two-part flask, a screw for forcing the two parts of the flask together, a casing adapted to contain the flask, a stuffing box carried by the casing, a tubular guide longitudinally adjustable within the stuffing box, a rotatable wrench mounted within the guide, and a stuffing box carried by the guide about the wrench.

10. In an apparatus of the class described, the combination of a flask, a screw for forcing its members together, a casing adapted to contain the flask, a longitudinally adjustable tubular guide carried by the casing and extending through it, a rotary wrench mounted in the guide, and engaging screw threads on the wrench and guide.

11. In an apparatus of the class described, the combination of a flask, a screw for forcing its members together, a casing adapted to contain the flask, a longitudinally adjustable tubular guide carried by the casing and extending through it, a rotary wrench mounted in the guide, engaging screw threads on the wrench and guide, and an adjustable yoke carried by the casing and adapted to position the guide.

12. In an apparatus of the class described, the combination, with a flask, and an angular headed screw for forcing its members together, of an air-tight tank adapted to be opened, means for admitting fluid to said tank, a support within said tank on which the flask rests, a tubular guide extending through a packed joint in the top of the tank, a nut inclosing the upper end of the guide, a yoke whose arms are adjustably mounted on said top and whose cross head overlies said nut, and a key movably mounted through said guide and having a handle at its outer end and an angular socket in its inner extremity for engaging the head of said screw.

13. In an apparatus of the class described, the combination, with a flask and an angular-headed screw for forcing its members together, of an air-tight tank having a removable cover, means for admitting fluid to said tank, a tubular guide extending adjustably through the cover, a yoke consisting of bolts whose lower ends are connected with said cover and a cross head whose body is adapted to bear downwardly on said guide and whose extremities are engaged by said bolts beneath their nuts, and a rotatable key movably extending through said guide and having an angular socket in its inner extremity for engaging the head of said screw.

In testimony whereof I have hereunto set my hand in presence of two subscribing witnesses.

FRED THOMAS ROBERTS.

Witnesses:
J. RALPH HOGE,
J. A. GRIESBAUER.